Figure 1:
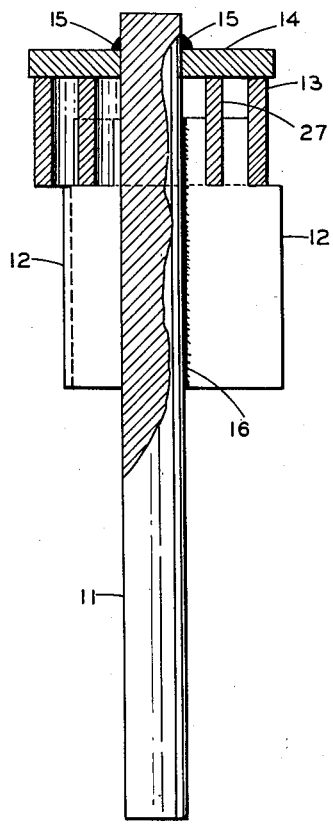

Sept. 23, 1952  R. E. HEFFNER  2,611,684
CATALYST SUPPORT

Filed Jan. 4, 1950  2 SHEETS—SHEET 1

INVENTOR.
R.E. HEFFNER
BY Hudson L Young
ATTORNEYS

Sept. 23, 1952 R. E. HEFFNER 2,611,684
CATALYST SUPPORT
Filed Jan. 4, 1950 2 SHEETS—SHEET 2

INVENTOR.
R. E. HEFFNER
BY Hudson & Young
ATTORNEYS

Patented Sept. 23, 1952

2,611,684

UNITED STATES PATENT OFFICE 2,611,684

CATALYST SUPPORT

Robert E. Heffner, Borger, Tex., assignor to Phillips Petroleum Company, a corporation of Delaware Application January 4, 1950, Serial No. 136,735

7 Claims. (Cl. 23—288)

This invention relates to apparatus for the catalytic conversion of hydrocarbons or other material. In one aspect, it relates to a tube-type apparatus in which to carry out catalytic conversion operations. In another aspect, it relates to an apparatus for the support of solid catalyst in tubes in high temperature catalytic conversions.

Catalyst support devices for use in tubular elements in high temperature conversion operations are known. One type of such device consists of a perforated disk having a diameter slightly less than the inside diameter of a catalyst-containing tube. The disk is supported by a rod or bar. The catalyst-containing tube terminates in a fitting having a larger diameter than the tube. The rod or bar carrying the perforate disk at its upper end rests against the bottom of this terminal fitting. In this type of catalyst support, the disk may under some conditions be tilted in such a manner that the plane of the disk is not perpendicular to the axis of the tube, and under such conditions, catalysts may pass between the edges of the disk and the walls of the tube. Perforate disks as catalyst supports frequently become plugged with the solid catalyst. When the catalyst is pelleted, the pellets may fit well into the perforations. Another disadvantage of perforate disk supports is that the ratio of the area of the openings to the diameter of the catalyst containing tube is small and any plugging of the openings materially affects this ratio. Pressure drops through such perforate disks frequently become excessive.

To overcome such disadvantages, I have devised a catalyst support apparatus for use in catalyst tubes in which the ratio of the area of the open space to the cross sectional area of the tube is relatively large. Such a condition favors small pressure drops through catalyst-containing tubes.

An object of my invention is to devise an apparatus for supporting catalysts in tubes used in high temperature conversion operations.

Another object of my invention is to provide a catalyst support apparatus for use in tubes in which the ratio of the free area to the cross sectional area of a tube is large.

Another object of my invention is to devise a catalyst support for use in tubes which support is simple of construction and easy to manufacture.

Still another object of my invention is to provide a support for catalysts in tubes which support may be used in high temperature conversion operations without inducing stresses in the tubes.

Yet another object of my invention is to provide such a catalyst support which will remain positioned in a definite and fixed relation with respect to its containing tube.

Still other objects and advantages of my invention will be obvious upon reading the following disclosure which, taken with the attached drawing, forms a part of this specification.

Figure 2:
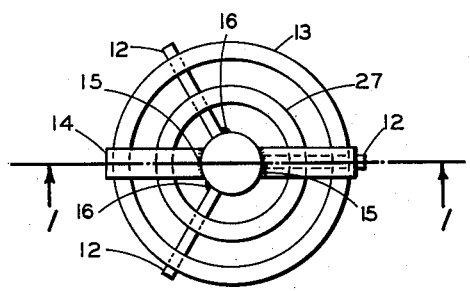
Figure 3:
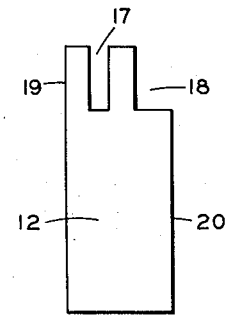
Figure 4:
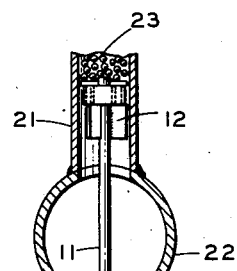
Figure 5:
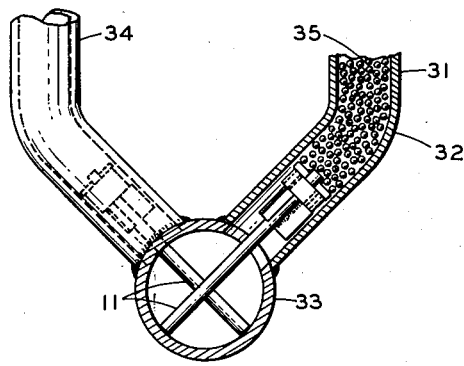
Figure 6:
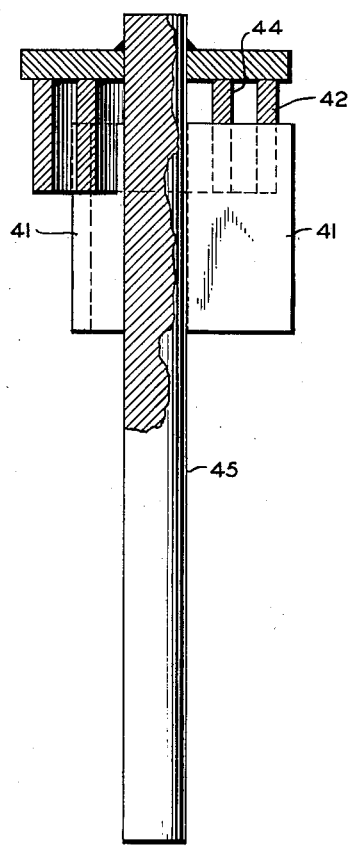
Figure 7:
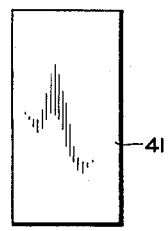
Figure 8:
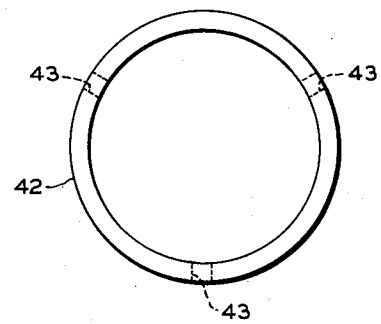
Figure 9:
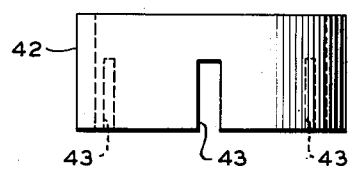
Figure 10:
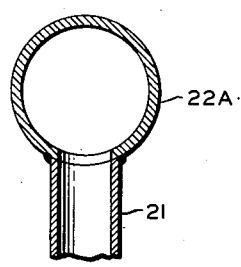

In the drawing, Figure 1 is an elevational view, partly in section, of the apparatus of Figure 2. Figure 2 is a plan view of the apparatus of Figure 1. Figure 3 is a side view of one piece of apparatus shown in Figures 1 and 2. Figure 4 shows my catalyst support apparatus disposed in one form of tube. Figure 5 shows my catalyst support apparatus disposed in another form of tube. Figure 6 is an elevational view, partly in section, of another embodiment of my invention. Figure 7 is a side view of one piece of apparatus shown in Figure 6. Figure 8 is a plan view of another piece of apparatus shown in Figure 6. Figure 9 is an elevational view of the apparatus of Figure 8. Figure 10 is a sectional view of a portion of the apparatus of Figure 4 attached to a top header.

Referring now to the drawing, my catalyst support apparatus consists of an elongated rod 11 to which is attached some flanges 12. I have shown three flanges disposed radially with respect to the rod 11 and equally spaced around the circumference of the rod. Each flange has a slot 17 and a cutaway space 18. The edge 19 of flange 12 of Figure 3 is the edge which is attached to the rod 11. In Figure 1 this attachment is indicated as by a weld 16.

Into the slot 17 of each of the three flanges is slipped a ring 27. This ring 27 is of such diameter that it slips easily into the slots 17. The width of the slots should preferably be slightly greater than the thickness of the ring 27 so that the ring is free to move in the slots. In this manner, the ring is free to expand or contract at different rates than the flanges.

A ring 13 of larger diameter than the ring 27 is fitted into the cutaway space 18 of the flanges. This larger diameter ring is also intended to slip freely into place so that binding of the ring against the edge of the flange will not occur and that these apparatus parts are free for thermal expansion and contraction. These rings may be short pipe sections, if desired.

A cross rod 14 is fitted through a hole in the top portion of the rod 11 as may be seen in Figure 1. This rod 14 is tack-welded at one or more points 15 as illustrated. In positioning this rod 14, it is preferable that the rod be positioned out of contact with the rings 13 and 27 when the support apparatus is in an upright position. When this apparatus is installed in a catalytic conversion tube, this support apparatus is ordinarily in a generally vertical position with respect to the axis of the rod 11. The rings 27 and 13 rest freely in the slots 17 and the cutaway spaces 18, respectively. The positioning of the cross rod 14 is such that when this apparatus is heated to conversion temperatures, the vertical expansion of the rings 13 and 27 will not exert pressure against the rod 14. In other words, when my catalyst support apparatus is heated to high conversion temperatures, the rings 13 and 27 are intended to be free for maximum thermal expansion. The rings 13 and 27 may be considered as "floating rings" so that my entire catalyst support apparatus may be termed a more or less "floating supporting apparatus."

The portion of my apparatus having the greatest diameter is the outer edge of the flanges. The effective diameter of this section of the support is made slightly less than the diameter of the catalyst tube in which the support is to be inserted so that upon expansion during heating, the support will still be free for expansion without binding or without exerting stress or strain to the catalyst tube. The length of the rod 14 is also slightly shorter than the diameter of the tube. This rod need not be any or much longer than the outer diameter of the larger ring 13.

In Figure 4 is shown an assembly of my catalyst support in the bottom end of a tube, and at its top to a top header tube 22A, Figure 10. According to this figure, the tube 21 is attached at its bottom end to a header tube 22. Since header tubes ordinarily are manifolded to a plurality of such tubes as tube 21, the header tube is of considerably larger diameter than the catalyst-containing tube 21. The elongated rod 11 of my catalyst support is intended to be sufficiently long that it extends beyond the end of the catalyst tube and across the diameter of the header tube so that the weight of the catalyst support and the catalyst will be carried by the bottom portion of the header tube. The flanges 12 are intended to be disposed in their entirety in the catalyst tube. These flanges are sufficiently long that they act as guide or positioning members and as such they hold the catalyst support apparatus in such a position that the axis of the rod 11 and the axis of the tube 21 coincide. These flanges prevent lateral movement of the rod 11 so that at all times the axis of the rod 11 is in a vertical position when supporting catalyst in a vertically disposed catalyst tube. The distance between the rings 13 and 27 and the distance between the ring 27 and the rod 11 are of course made smaller than the diameter of the catalyst particles so that the catalyst will not filter through the support. This support is particularly adapted for use in processes wherein pelleted, pilled, or granulated catalyst is used. By use of one, two, or more rings, 13 and 27, this support assembly offers a relatively large free area for passage of fluid in process. The effective free area of this support apparatus when supporting a pelleted or pilled catalyst is still relatively large when compared to the available free area when perforated plate catalyst supports are used.

In Figure 5 is shown a type of installation of catalyst tubes in which the tubes are bent at a point near the point of attachment to the header. For example, tube 31 has a bend identified by reference numeral 32 at a short distance above the point of contact of the tube 31 with the header 33. Bent in the opposite direction is a tube 34, the bottom end of which is attached to the same header 33. For use of my catalyst support apparatus, it is preferable that the tubes 31 and 34 are not attached to the header 33 in a common vertical plane but that as illustrated in Figure 5, the tube 31 is attached to the header as shown, and at least a short distance down the length of the header is attached the tube 34. The tubes 31 and 34 should be sufficiently far apart from each other with respect to the longitudinal axis of the header 33 that the rod members 11 from the catalyst supports in the bottom of the tubes do not touch each other. Usually, however, such catalyst tubes are positioned apart by one or more diameters of the tubes.

In such an installation the catalyst support member is not vertically disposed but is carried at the same angle off of vertical as the portion of the tube 31 which is attached to the header 33. The guide flanges 12 operate in this embodiment to hold the catalyst support relatively rigidly so that the axis of the rod 11 and the axis of the lower portion of the tube 31 coincide. The support apparatus in the tube 34 is positioned in such a manner that its rod 11 is as shown in Figure 5.

As mentioned hereinabove, my catalyst support apparatus possesses the very distinct advantage of having a much greater free area for passage of reactant or reaction fluids than perforated catalyst supports. This relatively large free area is not plugged as are circular holes in conventional perforate plates. My catalyst support apparatus further is of much greater strength than known plate supports. The spacer plates or flanges 12 align the support assembly in the catalyst tube irrespective of the directional positioning of a catalyst tube.

The length of the flanges 12 is so chosen that the catalyst support grid will not pass the bend of tubes as shown in Figure 5 when the tubes are inverted for catalyst change or for any other reason.

In the embodiment herein shown and described, the slots 17 and the cut-away spaces 18 are for the purpose of positioning the support rings 27 and 13, respectively. In another embodiment of my invention, the top ends of the spacer plates or flanges 41 may not be slotted or contain cutaway spaces, as spaces 18, of Figure 3, but the flanges may be actually rectangular in shape, as in Figure 7. In this case, the bottoms of the corresponding rings 42 and 44 may be slotted at 43, Figures 8 and 9, and these slots 43 in the rings may then be slipped downward and over the top edges of the flanges 41, Figure 6. When three or more flanges are used around the circumference of the rod 45, the slots in the bottoms of the rings 42 and 44 definitely position the rings with respect to the flanges and the rings cannot slip laterally in any direction. Similarly, the rings cannot even rotate. While this embodiment involving slots in the bottoms of the rings is satisfactory for use in my catalyst support apparatus, I prefer to have the slots and cutaway spaces in the top of the flanges 12. In this preferred embodiment I believe the catalyst support apparatus is stronger structurally than in the less preferred embodiment just described.

Materials for construction of such catalyst support apparatus may, of course, be selected from those commercially available, and such material should be suitable for use under high temperature oxidizing or reducing conditions.

The above-described embodiments are given for illustrative purposes and should not be regarded as limiting my invention, the scope of which is set forth in the following claims.

Having described my invention, I claim:

1. A contact chamber comprising in combination a tube, in general vertically disposed and having an inlet for fluid at one end and an outlet for fluid at the other end, a header attached to the bottom of said tube for inlet and outlet of fluid, a header attached to the top of said tube for outlet and inlet of fluid, a support for solid catalyst in said tube comprising an elongated rod disposed axially with respect to said tube, a plurality of radially disposed elongated guide flanges attached at spaced intervals around said rod and near its top, a plurality of concentric rings resting in corrsponding grooves in the top of said guide flanges, and a diametrically disposed cross member above said concentric rings and said cross member attached to said axial rod.

2. In the apparatus of claim 1, said plurality of concentrically disposed rings is two.

3. A contact chamber comprising in combination a tube, in general vertically disposed and having an inlet for fluid at one end and an outlet for fluid at the other end, a header attached to the bottom of said tube for inlet and outlet of fluid, a header attached to the top of said tube for outlet and inlet of fluid, a support for solid catalyst in said tube comprising an elongated rod disposed axially with respect to said tube, a plurality of radially disposed elongated guide flanges attached at spaced intervals around said rod and near its top, a ring resting in a groove in the top of said guide flanges, said ring and said rod having a common center, a diametrically disposed cross member above said ring, and said cross member attached to said axial rod.

4. A contact chamber comprising in combination a tube, in general vertically disposed and having an inlet for fluid at one end and an outlet for fluid at the other end, a header attached to the bottom of said tube for inlet and outlet of fluid, a header attached to the top of said tube for outlet and inlet of fluid, a support for solid catalyst in said tube comprising an elongated rod disposed axially with respect to said tube, a plurality of radially disposed elongated guide flanges attached at spaced intervals around said rod and near its top, a ring having a plurality of grooves on its underside resting on said guide flanges, one each groove of said ring corresponding to one each of said guide flanges, and a diametrically disposed cross member above said ring, and said cross member attached to said axial rod.

5. In a generally vertically disposed tube for contacting a fluid with a fixed bed solid material, a support for said solid material comprising, in combination, an elongated rod in the bottom end of said tube and having its axis in common with the axis of the bottom portion of said tube, a plurality of plane elongated flanges positioned radially around said elongated rod, the long dimension of said flanges is disposed parallel to the axis of said rod, a ring disposed concentric with said elongated rod, said ring disposed in slots in the tops of said radially disposed flanges, and a cross member above said ring rigidly attached to said elongated rod.

6. In the apparatus of claim 5 wherein said plurality of plane vertically disposed flanges are three, said three flanges are disposed radially with respect to said elongated rod and at equal intervals circumferentially around said rod.

7. In a generally vertically disposed tube for contacting a fluid with a fixed bed solid material, a support for said solid material comprising, in combination, an elongated rod in the bottom end of said tube and having its axis in common with the axis of the bottom portion of said tube, three plane and elongated flanges disposed radially with respect to said elongated rod and at equal intervals circumferentially around said rod, the long dimension of said flanges is disposed parallel to the axis of said rod, a plurality of rings disposed concentric with said rod and in slots in the tops of said radially disposed flanges, and a cross member above said rings rigidly attached to said elongated rod.

ROBERT E. HEFFNER.

REFERENCES CITED

The following references are of record in the file of this patent:

UNITED STATES PATENTS

| Number | Name | Date |
| --- | --- | --- |
| 2,203,840 | Perkins | June 11, 1940 |